(12) United States Patent
Miyachi et al.

(10) Patent No.: US 10,120,687 B2
(45) Date of Patent: Nov. 6, 2018

(54) PROGRAMMABLE CONTROLLER

(71) Applicant: FANUC Corporation, Minamitsuru-gun, Yamanashi (JP)

(72) Inventors: Motoyoshi Miyachi, Minamitsuru-gun (JP); Yasushi Nomoto, Minamitsuru-gun (JP)

(73) Assignee: FANUC Corporation, Minamitsuru-gun, Yamanashi (JP)

( * ) Notice: Subject to any disclaimer, the term of this patent is extended or adjusted under 35 U.S.C. 154(b) by 0 days.

(21) Appl. No.: 14/629,528

(22) Filed: Feb. 24, 2015

(65) Prior Publication Data

US 2015/0242211 A1    Aug. 27, 2015

(30) Foreign Application Priority Data

Feb. 26, 2014    (JP) ................ 2014-035523

(51) Int. Cl.
*G06F 12/00* (2006.01)
*G06F 9/30* (2018.01)
(Continued)

(52) U.S. Cl.
CPC ...... *G06F 9/30047* (2013.01); *G06F 9/30054* (2013.01); *G06F 9/30058* (2013.01);
(Continued)

(58) Field of Classification Search
CPC ............ G06F 9/30047; G06F 9/30185; G06F 9/30054; G06F 9/3804; G06F 12/0875; G06F 9/30058; G06F 2212/452
(Continued)

(56) References Cited

U.S. PATENT DOCUMENTS 5,301,289 A * 4/1994 Suzuki ............... G06F 9/3806
                                                         711/213
5,586,295 A * 12/1996 Tran ................. G06F 9/3802
                                                         711/125
(Continued)

FOREIGN PATENT DOCUMENTS

CN        101558390 A       10/2009
JP         07200406    *     8/1995
(Continued)

OTHER PUBLICATIONS

Notification of Reasons for Refusal dated Jul. 21, 2015 in Japanese Patent Application No. 2014-035523 (3 pages) with an English Translation (3 pages).
(Continued)

*Primary Examiner* — Mardochee Chery
*Assistant Examiner* — Hamdy S Ahmed
(74) *Attorney, Agent, or Firm* — Drinker Biddle & Reath LLP

(57) ABSTRACT

A programmable controller for executing a sequence program comprises a processor for reading and executing an instruction code from an external memory, an instruction cache memory for storing a branch destination program code of a branch instruction included in the sequence program, and a cache controller for entering the branch destination program code in the instruction cache memory according to data on priority, the instruction code of the branch instruction including the data on priority of an entry into the instruction cache memory.

4 Claims, 5 Drawing Sheets

(51) Int. Cl.
*G06F 12/0875* (2016.01)
*G06F 9/38* (2018.01)

(52) U.S. Cl.
CPC ........ *G06F 9/30185* (2013.01); *G06F 9/3804* (2013.01); *G06F 12/0875* (2013.01); *G06F 2212/452* (2013.01)

(58) Field of Classification Search
USPC ....................................................... 711/125
See application file for complete search history.

(56) References Cited

U.S. PATENT DOCUMENTS

| | | | | |
|---|---|---|---|---|
| 5,600,842 | A * | 2/1997 | Kondo | G06F 9/267 712/235 |
| 6,772,325 | B1 * | 8/2004 | Irie | G06F 9/30058 712/237 |
| 6,895,496 | B1 * | 5/2005 | Taniguchi | G06F 9/3804 712/207 |
| 2002/0156964 | A1 * | 10/2002 | Fujii | G06F 9/3004 711/5 |
| 2007/0260858 | A1 * | 11/2007 | Takebe | G06F 9/3802 712/226 |
| 2008/0109644 | A1 | 5/2008 | Stempel et al. | |
| 2008/0235453 | A1 | 9/2008 | Emma et al. | |
| 2010/0095102 | A1 * | 4/2010 | Toyoshima | G06F 8/4442 712/233 |
| 2014/0351520 | A1 * | 11/2014 | Moharil | G06F 12/0871 711/122 |

FOREIGN PATENT DOCUMENTS

| | | |
|---|---|---|
| JP | H08-249041 A | 9/1996 |
| JP | H08-249177 A | 9/1996 |
| JP | 2001-022577 A | 1/2001 |
| JP | 2010-509680 A | 3/2010 |
| JP | 2013-073344 A | 4/2013 |

OTHER PUBLICATIONS

The Notification of the First Office Action dated Mar. 10, 2017 in Chinese Patent Application No. 2015100887378 (6 pages) with an English translation (8 pages).

Amir Kleen et al., "An improved instruction cache replacement algorithm," IEEE Workshop on Signal Processing Systems Design and Implementation, 2005, pp. 573-578 (ISSN 2162-3562).

Zhenlin Wang et al., "Using the compiler to improve cache replacement decisions," Proceedings of the 2002 International Conference on Parallel Architectures and Compilation Techniques, 2002, pp. 199-208, (ISSN 1089-795X).

Jennifer B. Sartor et al., "Cooperative caching with keep-me and evict-me," 9th Annual Workshop on Interaction between Compilers and Computer Architectures (INTERACT'05), 2005, pp. 46-57 (ISSN 1550-6207).

Milo Martin, "CIS 501 Introduction to Computer Architecture, Unit 3: Storage Hierarchy I: Caches," Fall 2005, available at https://www.cis.upenn.edu/~milom/cis501-Fall05/.

Office Action dated Sep. 22, 2017 in German Patent Application No. 10 2015 022 130.3 (17 pages) with an English translation (14 pages).

* cited by examiner

- OUTPUT ADDRESS TO EXTERNAL MEMORY
- OUTPUT CODE DATA FROM EXTERNAL MEMORY
- EXECUTE SEQUENCE PROGRAM (WITHOUT CACHE)
- EXECUTE SEQUENCE PROGRAM (WITH CACHE)

PC SET   START TO EXECUTE PROGRAM

- STORE VALUE OF SET PROGRAM COUNTER (PC) IN TAG
- CACHE MEMORY FOR STORING n BYTES OF BRANCH DESTINATION PROGRAM CODE DATA

PROGRAMMABLE CONTROLLER

RELATED APPLICATION DATA

This application claims priority under 35 U.S.C. § 119 and/or § 365 to Japanese Application No. 2014-035523 filed Feb. 26, 2014, the entire contents is incorporated herein by reference.

BACKGROUND OF THE INVENTION

1. Field of the Invention

The present invention relates to a programmable controller, particularly to a programmable controller including an instruction cache for rapidly processing a branch instruction.

2. Description of the Related Art

A procedure of executing a branch instruction such as CALL or JUMP in a programmable controller for executing a sequence program is as follows.
<1> Address data of an external memory is set in a program counter (PC) for a sequence program inside a processor.
<2> The processor outputs the address data to the external memory.
<3> The external memory outputs program code data.
<4> The processor takes and executes the program code data.

When the sequence program is stored in the external memory to the programmable controller, there is a time-lag between when the program counter (PC) is set and when the program starts to be executed, as illustrated in FIG. 5. The time-lag causes a longer branch instruction processing time. In order to avoid the problem that the branch instruction processing time is longer, for example, as disclosed in Japanese Patent Application Laid-Open No. 2001-22577 Publication or Patent Application No. 2010-509680 Publication, an instruction cache for storing a branch destination program code therein is generally provided, and the program code is rapidly read from the cache when a branch occurs, thereby shortening the processing time when the branch occurs (see FIG. 6 and FIG. 7).

As described above, also in a structure using the instruction cache, there is a problem that when the number of branch destinations is larger than the number of entries in the instruction caches, before the processor refers to the instruction cache, the instruction cache is always overwritten and no cache hit is found, and the instruction cache does not always operate validly.

SUMMARY OF THE INVENTION

It is therefore an object of the present invention to provide a programmable controller capable of shortening a time to process part or all of branch instructions used in a sequence program in the programmable controller for storing the sequence program in an external memory to a processor.

A programmable controller according to the present invention is directed for executing a sequence program, and comprises a processor for reading and executing an instruction code from an external memory, an instruction cache memory for storing a branch destination program code of a branch instruction included in the sequence program, and a cache controller for entering a branch destination program code in the instruction cache memory according to data on priority, the instruction code of the branch instruction including the data on priority of an entry into the instruction cache memory.

A programmable controller according to the present invention is directed for executing a sequence program, and comprises a processor for reading and executing an instruction code from an external memory, an instruction cache memory for storing a branch destination program code of a branch instruction included in the sequence program, a counter for counting the number of executions of an individual branch instruction included in a sequence program while the sequence program is being executed, and a cache line filing-away unit for entering branch destination program codes of branch instructions in the instruction cache memory in descending order of the number of executions.

Data on processing priority may be added to each branch instruction code according to the number of executions of an individual branch instruction included in the sequence program.

A programmable controller according to the present invention is directed for executing a sequence program, and comprises a processor for reading and executing an instruction code from an external memory, an instruction cache memory for storing a branch destination program code of a branch instruction included in the sequence program, and a lock unit for, when all the entries in the instruction cache memory are filed away, preventing subsequent writing into the instruction cache memory.

The present invention employs the above structure, and can provide a programmable controller capable of shortening a time to process part or all of branch instructions used in a sequence program in the programmable controller for storing the sequence program in an external memory to a processor.

BRIEF DESCRIPTION OF THE DRAWINGS

The object and characteristics of the present invention will be apparent from the following description of embodiments with reference to the accompanying drawings. In which.

DETAILED DESCRIPTION OF THE PREFERRED EMBODIMENTS

Figure 1:
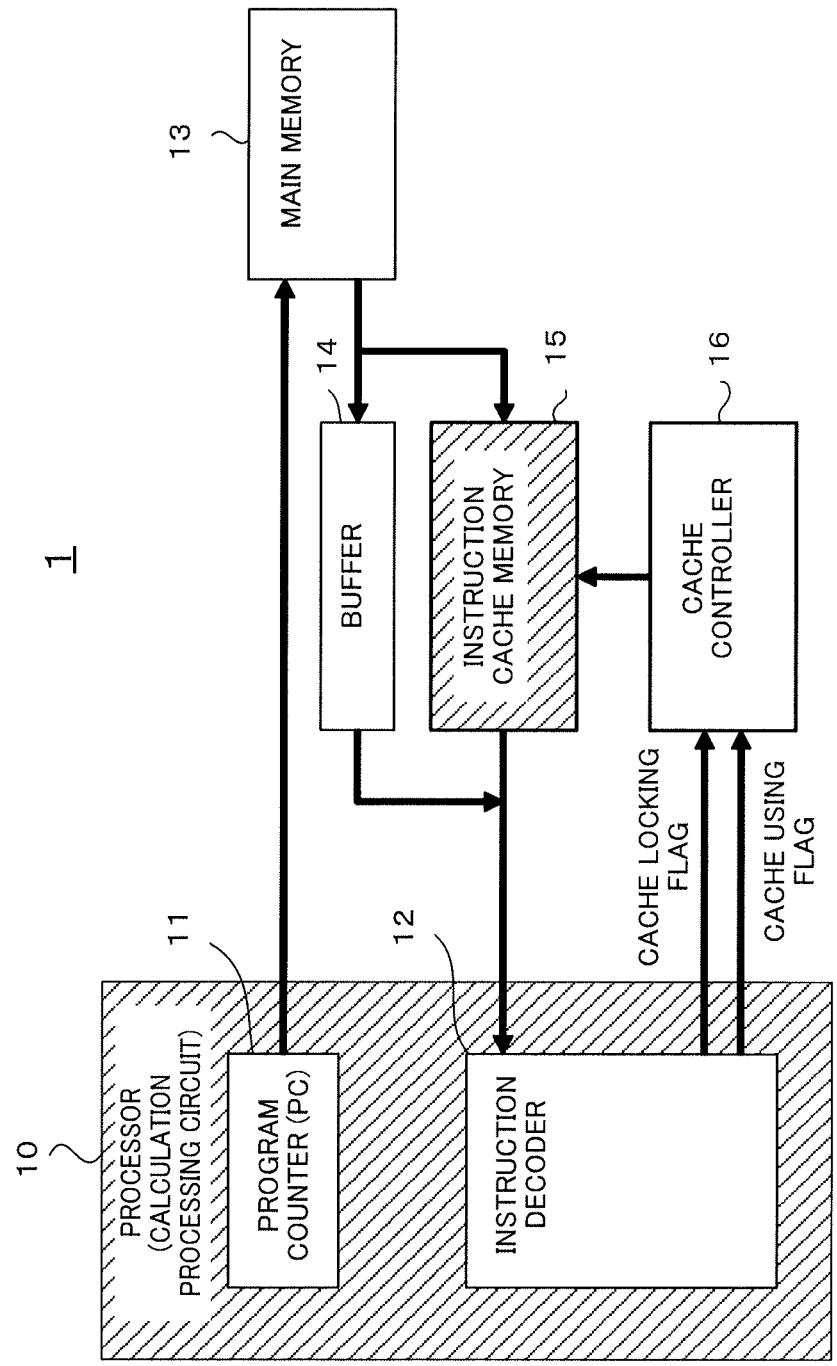
FIG. 1 is a diagram for explaining a structure of a programmable controller according to the present invention.
Figure 2:
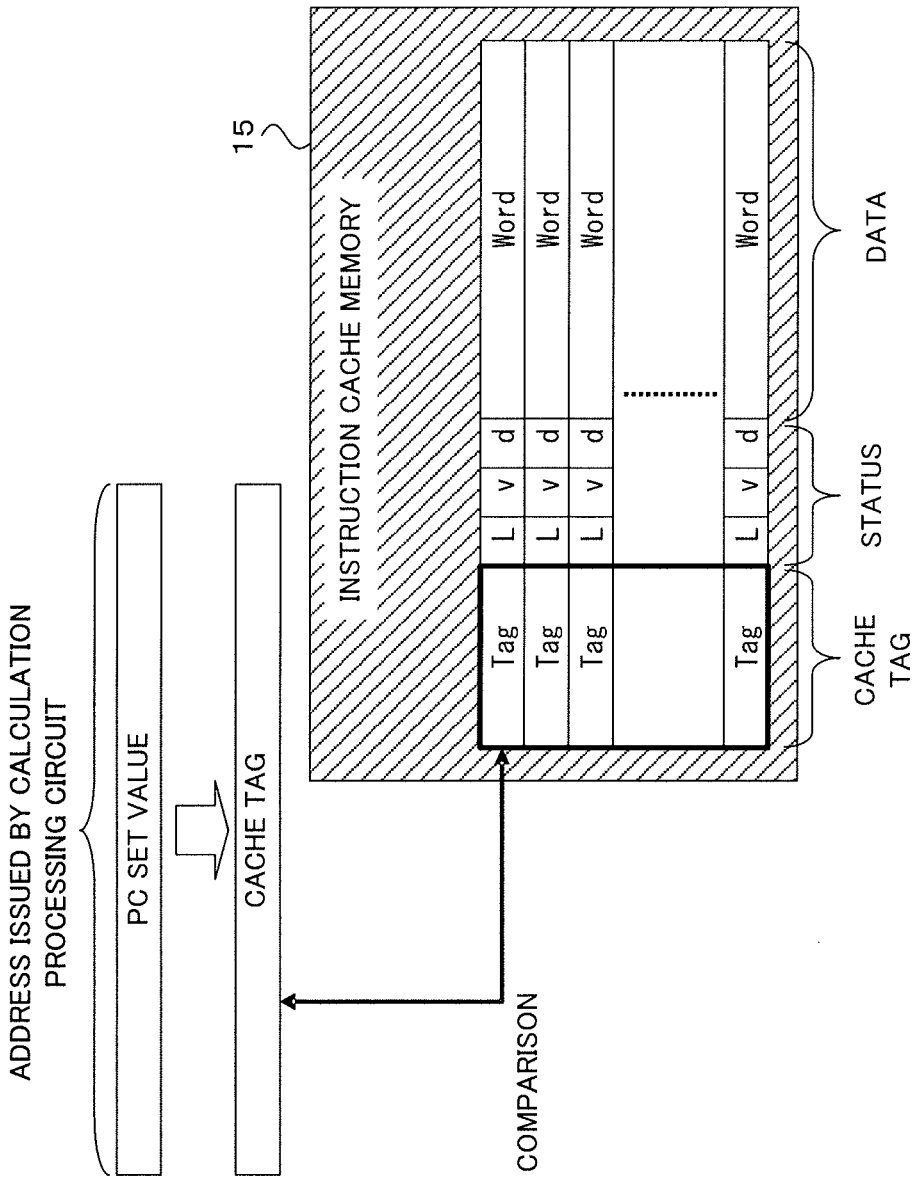
FIG. 2 is a diagram illustrating storage contents in an instruction cache memory.
Figure 3:
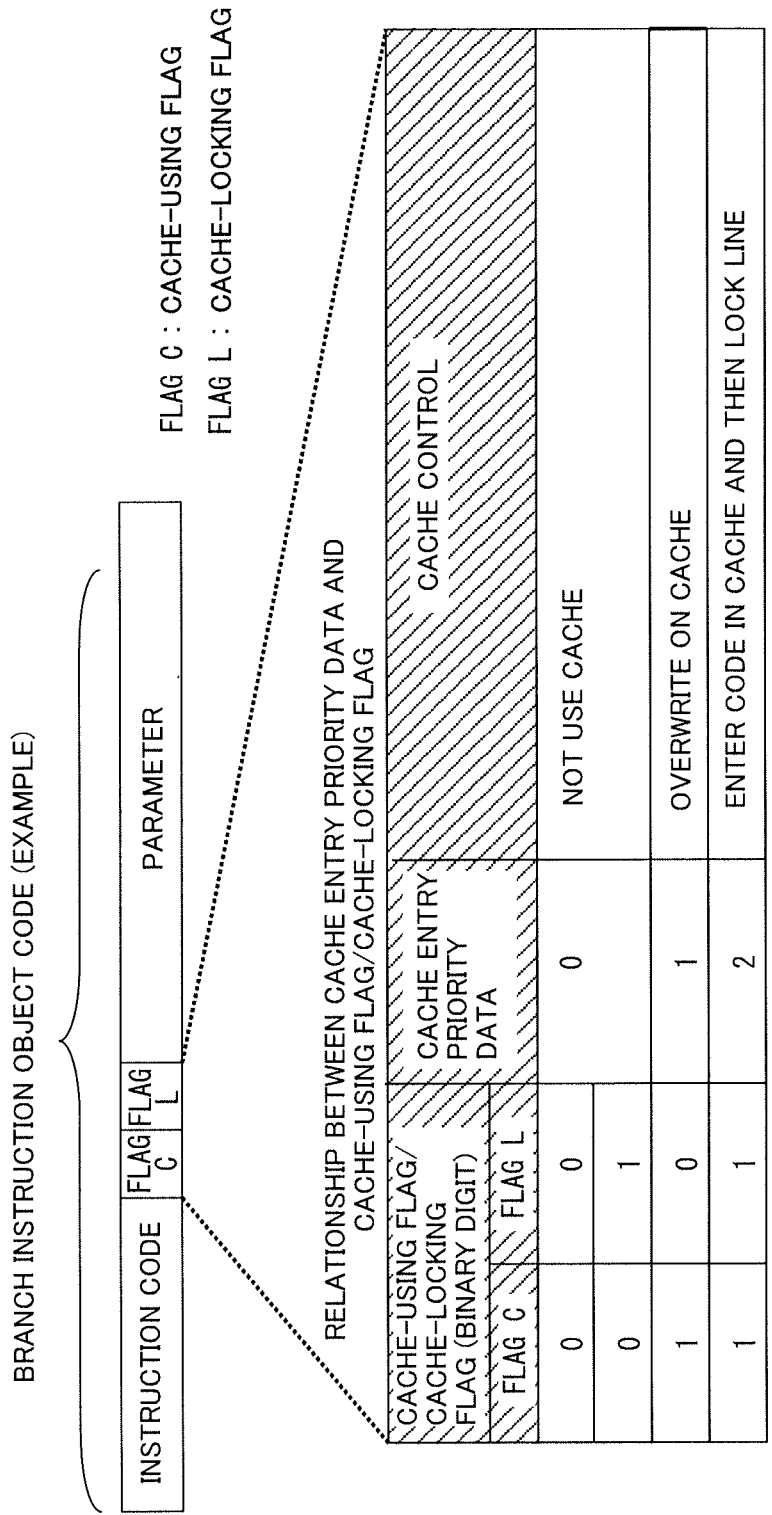
FIG. 3 is a diagram illustrating an exemplary branch instruction object code.
Figure 4:
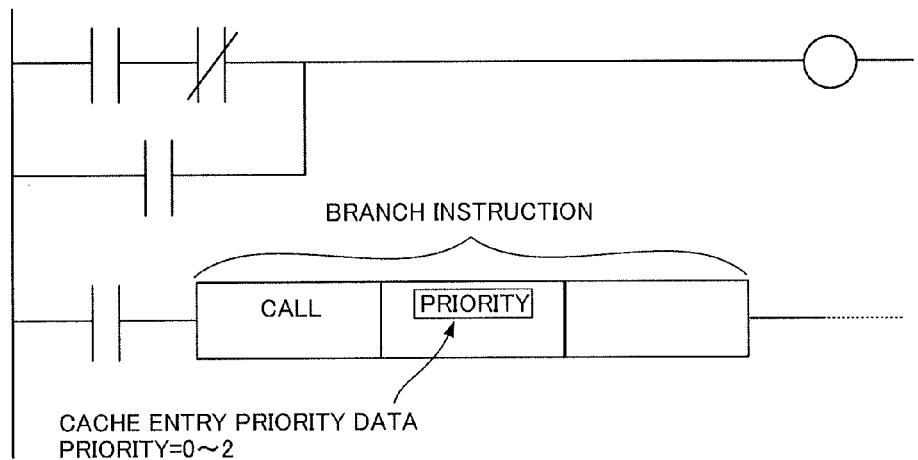
FIG. 4 is a diagram illustrating cache entry priority data incorporated in a branch instruction in a sequence program.
Figure 5:
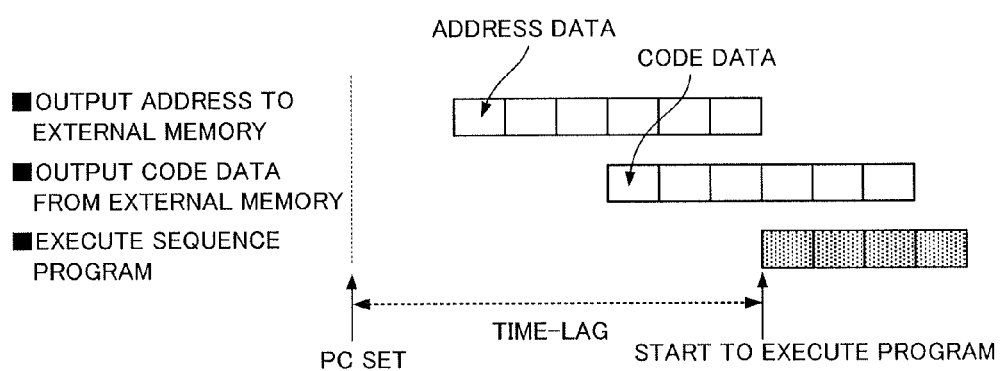
FIG. 5 is a diagram illustrating that there is a time-lag between when a PC is set and when a program starts to be executed.

FIG. 1 is a diagram for explaining a structure of a programmable controller according to some embodiments of the present invention. FIG. 2 is a diagram illustrating storage contents in an instruction cache memory. FIG. 3 is a diagram illustrating an exemplary branch instruction object code. FIG. 4 is a diagram illustrating cache entry priority data incorporated in a branch instruction in a sequence program.

According to some embodiments of the present invention, the programmable controller for storing a sequence program in an external memory to a processor such as externallyattached SDRAM is configured to rapidly process a branch instruction such as CALL or JUMP.

As illustrated in FIG. 1, the programmable controller 1 comprises a processor 10, a main memory 13, a buffer 14, an instruction cache memory 15, and a cache controller 16. The processor 10 comprises a program counter (PC) 11 and an instruction decoder 12.

The instruction cache memory (see FIGS. 1 to 4) for storing some branch destination codes therein is provided in the programmable controller 1. In FIG. 2, d indicates dirty bit, v indicates valid bit, and L indicates lock bit. In FIG. 3, flag C indicates cache using flag, and flag L indicates cache locking flag.

Figure 6:
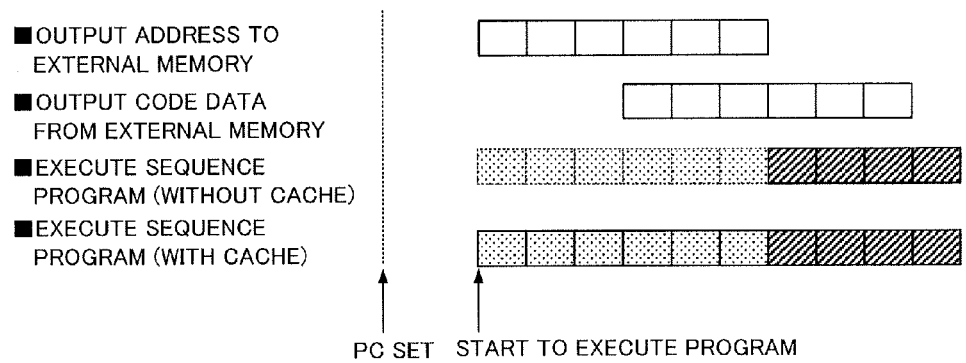
FIG. 6 is a diagram illustrating how a processing time is shortened by use of the instruction cache memory.
Figure 7:
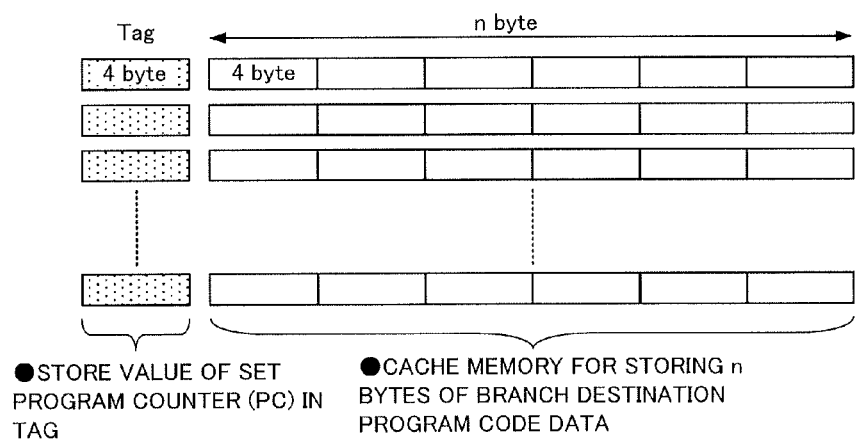
FIG. 7 is a diagram illustrating branch destination program code data stored in the instruction cache memory.

Immediately after the PC is set, code data is taken out from not the main memory 13 but the instruction cache memory 15 to execute a sequence program so that a time-lag which occurs when the code data is taken out from the main memory 13 is cancelled (see FIG. 6). In conventional caches, when the number of branch destinations of sub-routines in the program is larger than the number of entries into the cache, the cache is always overwritten before the processor 10 refers to the cache, and no cache hit may be found. On the other hand, similarly to a program processed by a typical processor, a branch instruction frequently executed and a branch instruction rarely executed are present in the sequence program. In order to avoid the problems of the conventional technique and to effectively use the instruction cache memory 15, the following specification is added. A user of the programmable controller 1 selects any of the following (1) to (3) for an entry into the cache. For example, when the number of branch destinations in the program is smaller than the number of entries into the cache, (3) is selected.

(1) Data on a rapid processing priority or an entry priority into the instruction cache memory 15 is added to an instruction code of a branch instruction such as CALL or JUMP. The priority is 3-ranked as follows, and the cache is used depending on a priority.

Priority 0: Not use the cache. Read a branch destination instruction code from the main memory 13 as an external memory.

Priority 1: Low priority. Permit to overwrite an entry. Perform the setting on sub-programs to be repeatedly called once called.

Priority 2: High priority. Lock a cache line after entry. No overwritten cache line. Instruction data is always written in the cache.

A programmer adds the priority data during programming according to the specification of the sequence program (see FIG. 4). When the sequence program is compiled, the priority added to the branch instruction code is referred to thereby to determine how the branch destination code of which branch instruction is entered (mapped) in the cache. The branch destination code is actually written in the cache when the branch instruction is executed.

(2) While the sequence program is being executed, the number of executions of an individual branch instruction included in the program is counted and the branch destination program codes of the branch instructions are entered (mapped) in the cache in descending order of the number of executions. The once-entered branch destination program code is not overwritten. The number of executions of each branch instruction in the program is counted by doing a sequence program execution simulation in software, for example. This corresponds to the description in CLAIMS "a counter for counting the number of executions of an individual branch instruction included in a sequence program while the sequence program is being executed, and a cache line filing-away unit for entering branch destination program codes of branch instructions in the instruction cache memory in descending order of the number of executions."

(3) The priority is not set for an entry into the cache, and similar filing-away to typical cache is performed. When all the entries are filed away (met), subsequent writing into the cache is disabled (locked). The instruction data is not overwritten due to the locking, thereby avoiding the above problem.

The programmable controller 1 illustrated in FIG. 1 performs the branch instruction processings as follows, for example.

<1> A calculation processing circuit (processor 10) fetches a branch instruction code.

<2> The calculation processing circuit extracts a cache using flag and a cache locking flag (FIG. 3) included in the branch instruction code and transfers them to the cache controller 16 (see FIG. 1).

<3> The calculation processing circuit (processor 10) sets the program counter (PC) according to the branch instruction. Herein, a value of the PC is assumed to indicate a physical address of the main memory 13.

<4> The cache controller 16 refers to the cache using flag.

A case in which the cache using flag is "valid" and a case in which the cache using flag is "invalid" will be described below.

[1] When the Cache Using Flag is "Valid"

The cache controller 16 compares a cache tag of the instruction cache memory 15 with a value of the PC (see FIG. 2). If the value of the PC corresponds to a value in the tag of the instruction cache memory 15, the branch destination program code is determined as being stored in the instruction cache memory 15.

(i) When the branch destination program code is entered in the cache memory (cache hit)

The branch destination program code starts to be read from the address "PC+cache line size (bytes)" of the main memory. The program code read from the main memory is stored in the buffer.

The calculation processing circuit executes the program code stored in the cache memory, and then reads and executes the program code stored in the buffer.

(ii) When the branch destination program code is not entered in the instruction cache memory (cache mishit)

The branch destination program code starts to be read from the address "PC" of the main memory 13.

The cache controller 16 enters the branch destination program code in a non-written line in the instruction cache memory 15 if any, or in a line where the lock bit is invalid if a non-written line is not present.

At this time, the cache locking flag extracted from the branch instruction code is copied to the status lock bit in the cache memory as it is.

When all the lines in the cache memory are locked, no entry is made into the instruction cache memory 15. Then, the similar processings to the processings other than the branch instruction are sequentially performed.

[2] When the Cache Using Flag is "Invalid"

An entry is not made into the instruction cache memory 15 and the similar processings to the processings other than the branch instruction are sequentially performed. Also when there is simply employed a specification that the cache controller 16 locks the entire cache when the program data is entered in all the lines in the cache irrespective of a lock bit status of the cache lines, a phenomenon that the cache is always overwritten and no cache hit is found (the problem to be solved by the invention) can be avoided.

The invention claimed is:

1. A programmable controller for executing a sequence program, the programmable controller comprising:
   a processor for reading and executing an instruction code of a branch instruction from an external memory, the instruction code comprising a branch destination program code, the external memory being separate and distinct from the processor;
   an instruction cache memory, separate and distinct from the processor, for storing the branch destination program code, the branch destination program code being entered into the instruction cache memory before the processor executes the instruction code; and
   a cache controller for entering the branch destination program code in the instruction cache memory according to data on priority, the instruction code of the branch instruction including the data on priority of an entry into the instruction cache memory, wherein the data on priority indicates whether the branch destination program code is to be read from the external memory.

2. A programmable controller for executing a sequence program, the programmable controller comprising:
   a processor for reading and executing an instruction code of a branch instruction from an external memory, the instruction code comprising a branch destination program code, the external memory being separate and distinct from the processor;
   an instruction cache memory, separate and distinct from the processor, for storing the branch destination program code, the branch destination program code being entered into the instruction cache memory before the processor executes the instruction code;
   a counter for counting the number of executions of an individual branch instruction included in a sequence program while the sequence program is being executed; and
   a cache line filing-away unit for entering branch destination program codes in the instruction cache memory in descending order of the number of executions,
   wherein data on processing priority is added to each branch instruction code, the data on processing priority indicates whether the branch destination program code is to be read from the external memory.

3. The programmable controller according to claim 2, wherein the data on processing priority is added to each branch instruction code according to the number of executions of an individual branch instruction included in the sequence program.

4. A programmable controller for executing a sequence program, the programmable controller comprising:
   a processor for reading and executing an instruction code of a branch instruction from an external memory, the instruction code comprising a branch destination program code, the external memory being separate and distinct from the processor;
   an instruction cache memory, separate and distinct from the processor, for storing the branch destination program code, the branch destination program code being entered into the instruction cache memory before the processor executes the instruction code; and
   a lock unit for, when all the entries in the instruction cache memory are filed away, preventing subsequent writing into the instruction cache memory,
   wherein data on processing priority is added to each branch instruction, the data on processing priority indicates whether the branch destination program code is to be read from the external memory.

* * * * *